(12) United States Patent
Patel et al.

(10) Patent No.: US 7,767,132 B2
(45) Date of Patent: *Aug. 3, 2010

(54) THREE-DIMENSIONAL STRUCTURED PRINTING

(75) Inventors: Ranjana Patel, Herts (GB); Richard J. Peace, Bedford (GB); Yong Zhao, Cambridge (GB); Jeremy Powell, Cambridge (GB); Michael Rhodes, Suffolk (GB)

(73) Assignee: Huntsman Advanced Materials Americas, Inc., The Woodlands, TX (US)

( * ) Notice: Subject to any disclaimer, the term of this patent is extended or adjusted under 35 U.S.C. 154(b) by 111 days.

This patent is subject to a terminal disclaimer.

(21) Appl. No.: 12/044,269

(22) Filed: Mar. 7, 2008

(65) Prior Publication Data

US 2008/0157436 A1   Jul. 3, 2008

Related U.S. Application Data

(63) Continuation of application No. 10/399,444, filed as application No. PCT/GB02/00615 on Feb. 12, 2002, now Pat. No. 7,455,804.

(30) Foreign Application Priority Data

Feb. 15, 2001 (GB) ................... 0103754.8

(51) Int. Cl.
*B27N 5/00* (2006.01)
*B29C 35/08* (2006.01)
*B29C 41/02* (2006.01)

(52) U.S. Cl. ................... 264/460; 264/113; 264/463

(58) Field of Classification Search ............... 264/113, 264/460, 463
See application file for complete search history.

(56) References Cited

U.S. PATENT DOCUMENTS

| 5,204,055 | A | 4/1993 | Sachs et al. |
|---|---|---|---|
| 5,340,656 | A | 8/1994 | Sachs et al. |
| 5,466,751 | A | 11/1995 | Gutweiler et al. |
| 5,902,441 | A | 5/1999 | Bredt et al. |
| 6,363,606 | B1 | 4/2002 | Johnson, Jr. et al. |
| 6,375,874 | B1 | 4/2002 | Russell et al. |
| 6,742,456 | B1 | 6/2004 | Kasperchik et al. |
| 6,762,002 | B2 | 7/2004 | Lawton et al. |
| 2001/0045678 | A1 | 11/2001 | Kubo et al. |
| 2001/0050031 | A1 | 12/2001 | Bredt et al. |
| 2006/0208388 | A1 | 9/2006 | Bredt et al. |

FOREIGN PATENT DOCUMENTS

| JP | 63149112 | 6/1988 |
|---|---|---|
| WO | WO 98/56566 | 12/1998 |
| WO | WO 00/26026 | 5/2000 |
| WO | WO 01/34371 | 5/2001 |

OTHER PUBLICATIONS

U.S. Appl. No. 60/164,000, filed Nov. 5, 1999, Bredt, et al.

*Primary Examiner*—Leo B Tentoni

(57) ABSTRACT

A process for forming a three-dimensional article in sequential layers in accordance with a digital model of the article. The process comprises the steps of defining a layer of powder material, applying a liquid reagent to the powder layer in a pattern corresponding to the digital model, and repeating these steps to form successive layers. The powder comprises a first reactive component and the liquid includes a second active component capable of reacting with the first reactive component so that the article is built up in layers.

20 Claims, No Drawings

THREE-DIMENSIONAL STRUCTURED PRINTING

CROSS REFERENCE TO RELATED APPLICATIONS

This application is a continuation application of U.S. patent application Ser. No. 10/399,444, filed Sep. 15, 2003, now U.S. Pat. No. 7,455,804, which was the National Phase of International Application PCT/GB02/00615 filed Feb. 12, 2002 which designated the U.S. and which claimed priority to United Kingdom (GB) Pat. App. No. 01037548 filed Feb. 15, 2001. The noted applications are incorporated herein by reference.

The present invention relates to three-dimensional structured printing, more specifically, a method of forming 3-D objects by jet printing techniques using computer models.

The process involved in manufacturing articles or parts is undergoing a considerable streamlining of workflow, enabled by the advent of high speed desktop computing with high processing capability, versatile CAD software able to create and represent 3-D objects, and high speed transmission of created digital files for global distribution. Within this developing scenario, it is of growing importance to have the ability to translate the created three dimensional digital files into handleable objects which truly represent or "proof" the digital files. This is particularly so when the created objects actually have the functionality of the objects which are to be manufactured, ultimately.

"Rapid Prototyping" systems were devised several years ago to provide such capability. In particular, stereolithography has developed as a technique capable of creating high accuracy 3-D objects using layerwise digital curing of photopolymers. This has developed significantly as a pioneering technology to produce three dimensional objects using UV lasers and liquid photosensitive photopolymerisable resin mixtures from CAD files, however, the equipment is at present expensive and requires expert users.

An example of this can be found in U.S. Pat. No. 4,575,330. In this case, a digital representation of a 3-D object is taken and converted into a succession of digital laminae. A thin layer of a UV photosensitive curable liquid polymer is formed on a platform and this is cured in the desired pattern using a UV laser source directed to the appropriate positions on the liquid layer in accordance with the digital representation of the respective lamina. This is then repeated. A problem with this system is that it is restricted in the materials available and does not readily allow for variations in the composition of the object.

Another existing technique which is in some ways similar, is the laser sintering of successive powder layers as shown in U.S. Pat. No. 4,863,538. Examples of another system can be found in U.S. Pat. No. 5,204,055 and U.S. Pat. No. 5,340,656. These describe applying a liquid to successive powder layers in order to bond the powder layers in the required pattern. In U.S. Pat. No. 5,807,437, the liquid is applied effectively using inkjet nozzles which enable variable deflection of the liquid droplets. A drawback of those systems is that the object produced can be delicate and prone to damage.

A more recent development is the hot-melt system, described in U.S. Pat. No. 5,855,836. In this case a solid formulation is heated until it melts and is sprayed in a desired pattern on to a substrate. It then cools and solidifies, and the sequence is repeated to build a 3-D object. The formulation includes a reactive component which is finally activated to cure the object. A disadvantage here again is that the materials available are extremely limited.

It is an object of the present invention to provide a process for forming a 3-D object which does not suffer the drawbacks of the prior art systems. More specifically, the invention seeks to provide a method which can produce an object which is robust and which can have varying micro and macro properties. It is a further object to provide void-free objects.

According to one aspect of the invention, there is provided a process for forming a three-dimensional article in sequential cross-sectional layers in accordance with a model of the article, the process comprising the steps of: defining a layer of powder material; applying a liquid reagent to the powder layer in a pattern corresponding to the respective cross-sectional layer of the model; and repeating these steps to form successive layers; and in which the powder substantially comprises a first reactive component and the liquid includes a second active component, the second active component being capable of either reacting with the first reactive component or facilitating the first reactive component to react with itself.

Thus, the two reactive components react on contact to form a solid lamina in the required pattern and this is repeated to form a solid article.

Preferably, the liquid reagent additionally comprises a viscosity lowering diluent.

According to another aspect of the invention, there is provided a process for forming a three-dimensional article structured in sequential cross-sectional layers in accordance with a model of the article, the process comprising the steps of: defining a layer of powder material; applying a liquid reagent to the powder layer in a pattern corresponding to the respective cross-sectional layer of the model; and repeating these steps to form successive layers; and in which the powder includes a first reactive component and the liquid includes a viscosity-lowering diluent and a second active component, the second active component being capable of either reacting with the first reactive component, or facilitating the first reactive component to react with itself.

Preferably the model is a digital model. Preferably the second active component acts as a catalyst to facilitate cross-linking of the first reactive component.

Preferably the powder substantially comprises the first reactive component.

The reaction may be in the form of swelling and tackification of the powder particles and then actual chemical reaction with the fluid.

It has been found that the system according to the invention can allow the formed article to be relatively robust since the reactive powder and the liquid react chemically to form a new chemical component. Chemical bonds can also form between layers and so there may be no dependence on the mechanical bonding relied upon in the prior art systems. The articles produced are void-free and free of powder relics within the structure. Effectively, the process gives rise to dissolution of the powder by the liquid giving a viscous resin which then cures. This is to be contrasted with systems in which the liquid serves merely to bind powder particles together without any chemical interaction.

The powder undergoes rapid dissolution on contact with the liquid. This produces a viscous, practically immobile resin which will retain its shape until curing is complete. This may be particularly achieved when the liquid is jetted at elevated temperatures, as mentioned below.

The effect of the diluent is twofold. Firstly, the lowering of the viscosity enables the liquid to be jetted out of smaller bore nozzles, without the need to raise the temperature, thereby achieving a superior resolution. Secondly, it improves penetration of the liquid into the body of the powder, thereby achieving a more homogeneous distribution of the reactants while also enabling rapid aggregation of the powder improving resolution and further allowing the reactive liquid present in the jet liquid to react firmly with the surface of and interior of the powder.

The powder layers may all be of the same formulation, however, different materials can be used for different layers, or even in the same layer. Different liquids may also be used, either at different locations on the same layer or on different layers. Conveniently, the liquid is applied using a linear array of nozzles which are passed over the powder layer. Thus different liquids can be supplied to different nozzles and/or different liquids can be applied in respective sequential passes, either over the same powder layer or succeeding layers.

The layerwise construction of the three dimensional object can thus be such that different liquids may be jetted/sprayed imagewise during each layer construction or in different whole layers or multi-layers, thus affording differing properties of strength and flexibility.

The process may include a further step of irradiating the article. The article may be irradiated pixel by pixel, line by line or layer by layer, and/or after several layers have been formed, and/or after all the layers have been formed. Preferably, electromagnetic radiation is employed. Suitable sources include UV light, microwave radiation, visible light, laser beams, and other similar sources.

The nozzle system employed is preferably equivalent or identical to that used in inkjet systems, preferably piezo inkjet systems. Preferably, the size of the nozzle openings is the range 10 to 100 µm and/or the size of the applied droplets is in the range 5 to 100 µm, although the nozzle openings may be smaller than 1 µm, even as small as a few nanometres, thus allowing correspondingly sized droplets to be applied. Preferably, the process includes the step of varying the number of pixel drops and/or varying the applied liquid per pixel, per line applied and/or per layer, in order to achieve variable properties in the article. Another following jet or spray may cover same previously addressed area.

By combining the compositions with programmable piezo printhead technology, it is possible to vary micro-material properties of the formed object, to achieve strength, texture and variable macro properties required in actual functional 3D objects. As Pixel addressability with piezo printheads can be as high as 20 micron spots, the resulting resolution can match the resolution achievable using laser address systems. This addressability will go even higher with the use of Nano-jet technology delivering picoliter volumes of liquid, or less.

Highly precise objects can be fabricated with fine detail. Different fluids/components can be dispensed pixel-wise, line wise and layer wise within these address schemes, with further differentiation possible through clustering in the pixels, lines and layers in a random or configured manner, to provide even more material property variation from flexible, elastic and conformable, to rigid and toughened. In addition to differential material properties (mechanical, and texture), true and accurate colour rendition in the formed object is available by having colourisable or decolourisable reactive powder or by incorporating colourants in the dispensing liquids. Furthermore, the layers can be of different thicknesses and each layer can itself be formed with a prescribed topography by varying its thickness over its extent. The topography between and in layers can be patterned, thus achieving optical or mechanical effects. The patterns (optical, electro, or integral electro-optical) can be planar (ie. within a layer) or can be 3-Dimensionally disclosed circuit within the laminar structure.

Typically, the formed layer may be up to 300 µm in thickness, though more commonly they might be up to 200 µm. Thin layers down to 80 µm or 50 µm may be achieved and possibly even thinner layers of 30 µm or 1 µm.

However to achieve these capabilities via the use of the arrays of adjacent nozzle jets, it is desirable in the first instance to have low viscosity liquids (less than 40 cps with 2-30 cps preferred at ambient temperatures), which can be jetted at high jet firing frequency preferably 5 to 20 KHz line frequency and preferably 60-100 KHz individual jet frequency).

It has therefore been found surprisingly that diluents present in the jetting liquid which act to reduce the viscosity of normal polymerisable mixtures from over 40 cps to below 15 cps (a more useful viscosity range), serve the dual purpose of viscosity lowering for jetting and enabling inter and intra powder crosslinking with the jetted polymerisable resin present also in the liquid. The diluent itself can adhere suitable powder particles together (ie. thermosetting or thermoplastic powders) giving coatings or 3D objects with the properties of the bulk polymer/composite making up the powder. This adherence effect probably involves wetting, swelling, and partial dissolving phenomena, such that the powder particles coalesce smoothly without the presence of fracture forming voids.

Most surprisingly however, the diluent also enables polymerising/crosslinkable liquids present in the dispensing liquid fluid to wet and penetrate the powder probably through polymer swelling/partial dissolving actions. Thus, polymerising/crosslinking can take place at the surface of and within the powder as well as within the jetted liquid residing between the powder particles.

Furthermore, when using powders which have complimentary chemistry to the polymerising/crosslinking components in the jetted liquid, effective micro/nano-mixing and reaction can be effected, yielding higher strength composites, without voids which can be initiating sources of fracture failure.

It has been found that delivery systems are now available which allow higher temperature jetting possibilities. Using this capability allows certain rheological advantages to be attained. Jetting liquid temperatures of up to and over 100° C. may be used, for example temperatures of 65° C. to 75° C. At a temperature of about 70° C., jetting delivers the liquid to what is effectively an insulating powder and so faster ingress and a faster reaction can be achieved.

Preferably, the powder comprises reactive organic or organometallic polymers, oligomers or monomers and the liquid reagent comprises a curable resin. The powder may also contain an organic or inorganic filler, a pigment, nanoparticles, a dye and/or a surfactant.

The powder can be a thermoplastic material eg polyvinylacetal, a surface treated powder eg. treated polypropylene, ABS or polycarbonate, or thermosetting powders, eg. epoxy powders from Vantico Ltd, such as that available under the designation PT8267, which is a powder derived from PT 810 poly-epoxy and polyester. The powder can include a suitably treated filler having reactivity on the surface, eg. epoxy-silane treated fillers such as silica. The powder may also comprise acrylated, epoxidised, aminated, hydroxylated organic or inorganic particles, present as such or as composite with a polymer.

Examples of suitable powders are polyacrylic acid, poly(acrylonitrile-co-butadiene), poly(allylamine), polyacrylic resins with functional acrylate groups, polybutadiene, epoxy functionalised butadienes, poly(glycidyl(meth)acrylate), polyTHF, polycaprolactone diols, HEMA, HEA, maleic anhydride polymers, eg. styrene-maleic anhydride, polyvinylbutyrals, polyvinyl alcohol, poly(4-vinylphenol), copolymers/blends of these compounds, and any of these compounds endcapped with epoxy, vinyl ether, acrylate/methacrylate, hydroxy, amine or vinyl moieties, as appropriate.

Inorganic or organic particles can be reactively surrounded/treated by monomeric, oligomeric or polymeric compounds which have additional reactive functionality which can participate into reaction with the jetted crosslinkable resin. Preferably, therefore, the diluent in the liquid has reactive groups capable of swelling and/or dissolving the powder.

The curable/polymerising/crosslinkable liquids can involve compounds which can undergo condensation reactions triggered either by thermosetting reactions such as epoxy/amine or isocyanate/polyol/amine etc., or by electromagnetically triggered cationic systems such as epoxy plus cationic photo-initiators (sulfonium, iodonium or ferrocenium), salts or radically cured systems such as acrylates, urethane acrylates, epoxy-acrylates, plus radical photoinitiators, benzophenone, Irgacure 184, alkylborates iodonium salts. In the former case, the reactants can be separately included in the liquid and the powder (eg. epoxy in the liquid and amine in the powder) or vice versa, such that on jetting, the two components react to form the condensation product. In the latter case, likewise, the photo-initiators may be present in the jet liquid, or powder, separately or together with the curable resin composition. If together with the curable resin, then the diluent can enable much faster reaction rates to be obtained on application of the jet liquid containing the diluent and the reaction triggering electromagnetic irradiation. The electromagnetic radiation can be administered imagewise in synchronisation with the liquid jet activation, pixel line or overall whole layer wise irradiation.

The liquids can be epoxy, acrylic, isocyanate, epoxy-acrylates, amino, hydroxy based compositions, as neat liquids, diluted liquids or as emulsions in water. In case of electromagnetically activated crosslinking reactions, the liquid may contain electromagnetic sensitive compounds, such that on jetting the liquid, the electromagnetically active, photoinitiator compound releases the crosslinking activator, eg. a radical or acid or base.

Examples of suitable liquids are one or more of cycloaliphatic epoxy optionally with diol/triol/polyol moieties, glycidyl epoxy, epoxidised polybutadiene, aliphatic/aromatic amine, methacrylate, acrylate, styrene/substituted styrene, acrylonitrile, vinyl ether, alkenes eg. isoprene, oxetane, organic acids or esters, organic acid halides, propenyl ether epoxides, siloxane epoxy or oxetanes, allyl nopol ether epoxide, and cycloaliphatic epoxy alcohols. All of these can be mono- or multi-functional.

The liquids may contain colloidal or nano-particles of ceramics, organic micro-particles, metals and alloys. The viscosity of the liquid can be from 2 to over 500 cps at room temperature and then have a much lower viscosity at higher operational temperatures. Preferably, the viscosity of the resin composition is low, eg. 2 to 20-30 cps, at room temperature to be compatible with current array piezojet systems. It has been found that diluents (reactive or not) not only enable the low viscosity to be attained, but also surprisingly help with the intimate curing between the crosslinking liquid and the reactive powder. This effect yields much tougher composites.

In one embodiment, the liquid will cure in the presence of the powder but does not rely on the powder to cure. This can be advantageous in areas in which the liquid does not come into contact with powder or a substantial amount of powder, eg. in the voids between particles, particularly if powder spreading has been flawed in places. Thus any unevenness in the powder spreading is overcome by using a reactive liquid which itself cures into a mass, filling in any gaps. An example would be a UV cure epoxy or acrylate fluid incorporating an initiator.

The jetted liquid can be jetted or micro-sprayed onto the powder. Two or more liquids may be jetted or sprayed simultaneously from adjacent jetting or spraying printheads such that the liquids combine either in flight or on/around the surface of the reactive powder. This process is particularly useful for jetting/spraying traditional two component adhesive resin mixtures, which have to be held separately until in use.

The liquid resin composition may contain pigments or dyes for producing coloured or selectively coloured parts.

Preferably, the diluent is present in the range 30 to 60% by volume, more preferably to 30 to 40. Preferably, the reactive component represents 30 to 80% of the powder, more preferably 50 to 70%. Preferably, the thickness of the powder layers is in the range 200 to 0.1 μm, more preferably 150 to 0.5 μm. It is appreciated that these are scaleable properties depending on powder size, number of reactive sites, eg. hydroxy or amino number and swelling characteristics of the powder on addition of the diluent/curable fluid resin.

There are various ways in which the powder layers can be built up. For example, powder material can be supplied to an enclosure and the article is formed on a platform within the enclosure. As each successive layer is formed, the platform is lowered into the enclosure and so a fresh supply of powder is placed on the previous layer. The powder can then be leveled off to the required thickness, eg. by a blade. In this way, the article is supported by the powder while it is being formed.

After 3 dimensional construction, the excess powder is removed, and the part is preferably further post-cured, either thermally or by using electromagnetic irradiation (eg. UV, visible, infra red, microwave etc).

The process lends itself very conveniently to the production of articles from a digital representation held by a computer, and is particularly suitable for use with CAD systems. Thus, an article can be designed using CAD software, the digital information can be converted to a series of laminae in digital form and the digital representation of the laminae can be used to control the delivery of the liquid sequentially on to successive layers of the powder, in order to reproduce the article in 3-dimensions. The techniques can be used for rapid prototyping and even small scale rapid manufacture.

The produced object can be used as an actual technically functional part or be used to provide a proof of the CAD files before actual production. The technique is also suitable for in-line production use as layered encapsulants in the electronic field and for formation of micro-printed optics. The technique may also be useful in forming multi-layer structured films with polarising optical or wave guiding effects.

It will be appreciated that by using the techniques of the present invention, it is possible to build up three dimensional articles in the form of laminated blocks or items with complex shapes. By varying the characteristics across the layers including layer thickness, as they are formed, optionally on a micro-scale, it is possible to instil at least a functionality in the finished article. This functionality can take many forms, examples of which include electronic circuits and optical components. In the case of electronic circuits, the techniques of the invention offer a method of producing intricate circuits of microscopic size. Preformed circuits can be embedded in the layers. In the case of optical components, the invention enables the optical properties of a component to be varied layer by layer and across each layer, and each layer can be of varying thickness, thereby enabling complex optical multilayer films to be produced.

It is also possible to build the component on to a substrate which is then retained as part of the final finished article. Such a substrate might be a glass or plastics sheet which could for example form part of an optical component.

The invention may be carried into practice in various ways and some embodiments will now be described by way of illustration in the following Examples.

EXAMPLE 1

Jetting Solvent onto Thermoplastic Powder (PolyvinylButyral) Powder

Butvar grade B-76, obtained from Solutia Inc. was chosen because of its known ability to crosslink or react via the hydroxy and acetal groups present in the polymer.

A layer (200 µm thick) of polyvinylbutyral B-76 (sieved to 100 µm size particles) obtained from Solutia, was spread on a microscope slide. The slide was placed on an X, Y table, housed in Jetlab equipment from MicroFab Technologies Ltd, Texas, USA. Acetone was jetted on the powder using a 50 micron jetting single Piezo printhead from MicroFab. 1000 drops were dispensed per spot. After shaking off the untreated powder, an aggregate of 650 µm diameter remained attached to the slide.

A line of the 1000 spots was written in a line across the long length of the slide. 4 other lines were similarly written, 500 µm apart.

After shaking off the powder, a panel of aggregated Butvar particles was obtained, approximately 5 mm wide. The aggregate was heated at 70° C. for 15 mins to yield a translucent panel of polymer, having a Tg of 56° C.

Further heating at 100° C. for one hour yielded a panel of polymer having a Tg of 73° C., indicating a degree of crosslinking was taking place.

EXAMPLE 2

Jetting UV Curable Resin XD4719 (Vantico Ltd) Diluted to 50% in MEK Onto PolyvinylButyral Powder Undiluted XD4719 which has a room temperature viscosity of 230 mPa·s, did not jet at room temperature and jetted unstably at 50° C. at which the viscosity is 55 mPa·s. However, repeatable jetting was obtained with 50% dilution with methyl ethyl ketone (MEK).

A layer (200 µm) of polyvinylbutyral B-76 was spread onto the microscope slide.

The slide was positioned and registered on an X, Y table of Jetlab equipment, produced by MicroFab. XD4719 diluted to 50% with MEK (viscosity 15 cp approx at room temperature) was jetted onto the powder as follows:

A grid of 2.5 mm by 2.5 mm cells covering an area of 25 mm by 25 mm was written on the powder using 50 drops of 50 µm droplet size per spot, with inter spot spacing of 100 µm. The sample was UV irradiated with high intensity UV.

On treatment with iso-propanol, the untreated areas were clear and swollen with the solvent, whereas jetted areas were opaque and not swollen, showing that the jetted resin had polymerised around the powder, protecting it from solvent effects.

The viscosity measurements were made in mPa·s using Brookfield IHBTDCP, CP40, 50 rpm.

EXAMPLE 3

Sequential Jetting on to Three Layers of Powder

The procedure of Example 2 was repeated three times, each time spreading a fresh 200 micron layer of powder over the previous jetted and UV irradiated layer.

Thus:

Step 1: a 200 µm layer of Butvar B-76 was jetted with the 50% MEK diluted XD4719, in a grid of 5 mm by 25 mm, with grid cell size of 2.5 mm by 2.5 mm. This was UV cured.

Step 2: as for step 1, but with a new layer spread on the first imaged layer. This was UV cured.

Step 3: as for step 2, but with a new layer spread on the second imaged layer. This was UV cured.

Thus in total 3 layers were treated. The excess untreated powder in the three layers was removed by shaking to reveal a three dimensional formed grid, 670 µm in height. On heating at 80° C. for 5 minutes a tough three dimensional grid was obtained.

EXAMPLE 4

The procedure of Example 3 was repeated, again using Butvar B-76 powder, but this time with a jet fluid made up of the cationic curable resin Oxetane UVR 6000 sensitised with a UVI 6974 sulfonium photoinitiator, both from Union Carbide jetted. using a 9-nozzle Siemens piezo printhead system. This oxetane mixture has a low viscosity (22 mPa·s/room temperature) and can therefore be jetted directly at room temperature.

The hydroxy groups in the Butvar B-76 powder are believed to react with the oxetane ring on acid catalysis, especially on further heating. A layer of B-76 powder (200 microns) was made in a flat dish. A fluid made up of 95% wt UVR 6000 and 5% wt UVI 6974 was jetted onto the powder using a Siemens 9 nozzle printhead.

The treated powder associated rapidly on being jetted with the fluid. Immediately afterwards, the layer was flood irradiated with UV and heated. Excess powder was shaken off, revealing a cured panel of powder/oxetane composite, which resisted breakage when pulled manually.

EXAMPLE 5

General Testing Procedure to Establish the Increase in Strength when UV Curable Resin XD4719 is Mixed with Powders A dog-bone mould of 6 cm×1 cm and 3 mm depth was filled by packing with the candidate powder. The amount of powder was weighed and mixed with equivalent weight amount of photomonomer compositions XD4719, from VANTICO LTD.

The slurry of powder and photomonomer was placed back into the mould and cured in 3 passes placed on a moving web, travel speed 10 m/min, under a UV light source (Fusion Systems F450, 120 W/cm).

The cured dogbone was analysed for the flexural strength and elongation at break. The results are shown in Table 1. As clearly seen, the composite of the XD resin with the reactive Butvar powder has increased strength, whilst maintaining very good elongation at break.

EXAMPLE 6

General testing procedure to establish the increase in strength achieved when a fluid made up of a reactive fluid (eg. UV curable resin XD4719) is mixed with a diluent which aids in the wetting and reaction between the powder and the curable fluid.

Example 6 is the same as Example 5, but with 20% wt of XD4719 replaced with methyl ethyl ketone (MEK).

As seen clearly in Table 1, there is a greater increase in strength after UV and heat cure of the Butvar-XD4719 composite when made using the diluent.

TABLE 1

Results from Example 5 and 6

| Powder | Example 5 XD 4719 | | Example 6 XD 4719 + 20% MEK | |
|---|---|---|---|---|
| | Tensile Strength MPa | Elongation @ Break % | Tensile Strength Mpa | Elongation @ Break % |
| 1) UV Cured Mix | | | | |
| None (only XD 4719) | 1.53 | 57.7 | | |
| Butvar B-76* | 1.62 | 65.8 | 0.74 | 74.5 |
| PT8267* | 2.12 | 44.9 | | |
| Mowital B 30T* | 3.91 | 88.9 | 0.55 | 44.8 |
| 2) UV Cured & Heated | | | | |
| None (only XD4719) | 3.17 | 92.4 | | |
| Butvar B-76** | 6.73 | 63.8 | 9.70 | 48.3 |
| PT8267** | 11.8 | 3.1 | | |
| Mowital B 30T** | 5.63 | 3.4 | 6.89 | 21.0 |

*Invention showing increased strength on adding powder to the XD 4719 resin & UV cure
**Invention showing much greater strength on UV and Heat curing
Significantly much greater strength with Example 6 which has the diluent MEK in XD4719
Butvar B-76 from Solutia Inc
Mowital B30T from Clariant AG
PT8267 from Resin Group, Vantico AG

EXAMPLES 7 to 20

In these Examples, the powder formulation A to H and liquid formulations A to G are as set out below.

Powder Formulations
Expressed as percentage by mass

| | A | B | C | D | E | F | G | H |
|---|---|---|---|---|---|---|---|---|
| Mowital B30H | | | | | 50 | | | |
| Mowital B30HH | | | | | | 50 | 100 | |
| Mowital B60T | | | 100 | | | | | |
| Mowital B60H | | | | | 100 | | | |
| Mowital B70H | 100 | | 50 | | | | | |
| Spheriglass | | 50 | | | | 100 | | |
| Duraform Polyamide | | | | | | | | 100 |

Liquid Formulations
Expressed as percentage by mass

| | A | B | C | D | E | F |
|---|---|---|---|---|---|---|
| Uvacure 1500 | 50 | 30 | 20 | | | |
| TMPO | 45 | 45 | | | | |
| UV16974 | 5 | 5 | 2 | | | |
| SR399 | | 20 | | | | |
| SR454 | | | 30 | 47 | 20 | 55 |
| SR306 | | | 30 | 30 | 25 | |
| SR238 | | | 14 | | 30 | 27 |
| Ir184 | | | 4 | | | |
| DVE-3 | | | | 10 | | |
| Ebecryl 1039 | | | | 8 | | 14 |
| Ebecryl 8402 | | | | | 20 | |
| Ir1800 | | | | 5 | 4 | 4 |

The additional materials used are as set out below.

| Material | Supplier | Description |
|---|---|---|
| SR399 | Cray Valley | Pentafunctional acrylate |
| SR454 | Cray Valley | Ethoxylated trimethylolpropane triacrylate |
| SR306 | Cary Valley | Tripropylene glycol diacrylate |
| SR238 | Cray Valley | 1,6-Hexanediol diacrylate |
| DVE-3 | BASF | Triethylene glycol divinyl ether |
| Ebecryl 8402 | UCB | Aliphatic urethane acrylate resin |
| Top 90 | Perstorp | Ethoxylated oxetane |
| Mowital B30H | Clariant | Polyvinylbutyral |
| Mowital B30HH | Clariant | Polyvinylbutyral |
| Mowital B45H | Clariant | Polyvinylbutyral |
| Mowital B60T | Clariant | Polyvinylbutyral |
| Mowital B60H | Clariant | Polyvinylbutyral |
| Mowital B70H | Clariant | Polyvinylbutyral |
| Spheriglass 2503 CP03 | Potters-Ballotini | Aminosilane coated glass spheres |
| Duraform Polyamide | DTM | Polyamide |

In these Examples, mechanical test specimens were built using the following procedure.

Step 1. A layer of the appropriate powder (500 μm) was spread on a metal plate, which was placed on an X-Y stage, housed in Jetlab equipment from MicroFab Technologies Ltd, Texas, USA.

Step 2. The appropriate resin was jetted onto the powder using a Microfab 50 μm single jet bead heated to 70° C., in a pattern consisting of lines spaced laterally by 250 μm, at a droplet density given below. The pattern was then cured by exposure to UV light (4 W, 2 mins).

Step 3. A further layer of powder (300 μm) was spread over the previous layer, and step 2 repeated.

Step 4. Step 3 was repeated 3 times. The article was removed from the free powder, and post cured according to the schedule specified in Table 2 below.

TABLE 2

Examples 7 to 20

| Example | Powder | Liquid | Print Density (drops per mm) | Tensile Strength (MPa) | Tensile Modulus (MPa) | Elongation Modulus (%) | Tg (° C.) | Notes |
|---|---|---|---|---|---|---|---|---|
| 7[b] | A | A | 250 | 13.5 | 395 | 5.0 | 68.9† | Opaque/Powdery |
| 8[b] | A | A | 300 | 30.0 | 751 | 7.2 | 78.2† | Glassy/Dark |
| 9 | F | A | 300 | Unsuitable for testing | | | | Continuous layers not formed |
| 10[b] | B | A | 300 | 38.8 | 861 | 7.7 | | Transparent |
| 11[a] | B | A | 300 | 47.5 | 1194 | 7.6 | 50‡ | Transparent |
| 12[a] | B | B | 300 | 23.3 | 606 | 5.7 | | Transparent |
| 13[a] | C | A | 300 | 28.5 | 1168 | 3.7 | | Translucent |
| 14[a] | D | C | 300 | 28.7 | 672 | 6.0 | | Transparent |
| 15[a] | E | D | 300 | 27.3 | 1600 | 3.6 | | Transparent |
| 16[a] | E | E | 300 | 12.2 | 300 | 21.9 | | Transparent |
| 17[a] | F | F | 300 | 26.3 | 670 | 7.4 | 55‡ | Transparent |
| Comparative Examples | | | | | | | | |
| 18[a] | G | A | 300 | 6.9 | 2574 | 0.25 | | Opaque |
| 19 | H | A | 300 | Too weak for testing | | | | Opaque |

[a] 2 hrs flood UV cure
[b] 2 hrs flood UV cure, 120° C. for 2 hrs
†Measured by DSC
‡Measured by DMA (G")

Comparison between Examples 8 and 13 and Comparative Example 18 shows the importance of the ingress mechanism. In Comparative Example 18, the powder consists solely of glass—no ingress or dissolution of the powder can occur, resulting in very weak specimens with low tensile strengths and elongation at break. Examples 8 and 13 use the same liquid, however, the presence of the Mowital B60T in the powder, which the liquid will partially dissolve, ingress into and react with, provides much greater tensile strengths. Comparative Example 19, in which the powder consists of a polyamide which is insoluble in the liquid, gives very weak parts due to the lack of solubility/ingress, and also due to the fact that the WV radiation is absorbed by the opaque nature of the samples.

Sufficient liquid is required for this mechanism to prove effective. Examples 7 and 8 differ only in the quantity of liquid provided per volume element of powder. A moderate increase in the volume of liquid provided (20% increase from Example 7 to Example 8) results in a large increase in tensile strength.

Poor specimens with lack of resolution result if the dissolution of the powder by the liquid is too great. Example 9 differs from Example 8 in the molecular weight and functionality of the polyvinylbutyral powder. Greater dissolution of the lower molecular weight powder in Example 9 results in the liquid dissolving the powder to produce balls on the surface of the powder bed instead of a continuous printing layer. Thus a system is required in which some ingress and dissolution of the powder occurs only to the extent that the resulting mixture is relatively immobile.

Tensile strengths and tensile moduli tend to be greater for those fluids which contain components (expoxy, oxetane, vinyl ether) which will react with the functional groups in the powders.

EXAMPLE 20

In this Example multiple jet fluids were applied to a common powder to give a single item with distinct regions of different mechanical properties. The following procedure was adopted.

| Fluid Formulation (expressed as % mass) | | |
|---|---|---|
| | A | G |
| Uvacure 1500 | 50 | 25 |
| TMPO | 45 | 45 |
| TOP 90 | | 25 |
| UV16974 | 5 | 5 |

Step 1 A layer of Mowital B60T (500 μm) was spread on a metal plate, which was placed on an X-Y stage, housed in Jetlab equipment from MicroFab Technologies Ltd, Texas, USA.

Step 2 Resin A was jetted onto the powder using a Microfab 50 μm single jet head heated to 70° C., in a pattern consisting of lines spaced laterally by 250 μm, at a droplet density of 300 drops/mm. The pattern, consisting of two squares (sides 20 mm, 10 mm apart) was then cured by exposure to UV light (4 W, 2 mins).

Step 3 A further layer of powder (300 μm) was spread over the previous layer, and step 2 repeated.

Step 4 A further layer of powder (300 μm) was spread over the previous layer, and step 2 repeated without the UV cure.

Step 5 Resin G was jetted onto the powder using the same printhead, heated to 70° C., in a pattern consisting of lines spaced laterally by 250 μm, at a droplet density of 300 drops/mm. The pattern, consisting of two rectangles (width 5 mm, length 18 mm, bridging the two previously printed squares) was then cured by exposure to WV light (4 W, 2 mins).

Step 6 A further layer of powder (300 μm) was spread over the previous layer, and step 5 repeated.

Step 7 Step 6 was repeated.

Step 8 The part was removed from the loose powder.

Areas produced from fluid A were rigid while the areas produced from fluid G were very flexible, producing an effective hinge. The application of multiple fluids to a single layer of powder (as occurs in layer 4) provides good bonding between areas made from different fluids.

The invention claimed is:

1. A process for forming a three-dimensional article in sequential cross-sectional layers in accordance with a model of the article, the process comprising the steps of:
   (i) defining a layer of powder material comprising a first reactive component;
   (ii) applying to the layer in a pattern corresponding to a respective cross-sectional layer of the model a liquid reagent comprising a second reactive component wherein the second reactive component includes an oxetane and a photoinitiator;
   (iii) irradiating the layer with electromagnetic radiation to cause the first reactive component to chemically react with itself or with the second reactive component to form a new chemical component and optionally to cause the second reactive component to cure and fill in gaps between the powder; and
   (iv) repeating steps (i) to (iii) to form successive layers; and wherein substantially void-free regions are formed in the article where the liquid reagent has been applied to the powder.

2. A process as claimed in claim 1, wherein the liquid reagent additionally comprises a viscosity lowering diluent.

3. A process as claimed in claim 1, wherein the model is a digital model.

4. A process as claimed in claim 1, wherein the article is irradiated, pixel by pixel, line by line or layer by layer, either randomly or clustered.

5. A process as claimed in claim 4, wherein the article is irradiated after several layers have been formed.

6. A process as claimed in claim 4, wherein the article is irradiated after all the layers have been formed.

7. A process as claimed in claim 4, wherein the irradiating step employs UV radiation.

8. A process as claimed in claim 1, wherein the liquid reagent is applied through a plurality of nozzles.

9. A process as claimed in claim 8, wherein the nozzles form part of an inkjet printer or a device including a set of nozzles equivalent to an inkjet print head.

10. A process as claimed in claim 9, wherein the nozzles operate on a piezo inkjet system.

11. A process as claimed in claim 10, wherein the size of the nozzle openings is in the range 0.01 to 100 μm and/or the size of the applied droplets is in the range 0.1 to 200 μm.

12. A process as claimed in claim 1, wherein the first reactive component comprises a reactive organic or organometallic polymer, oligomer or monomer and the second reactive component further comprises a curable resin.

13. A process as claimed in claim 12, wherein the powder material further contains an organic or inorganic filler, a pigment, nanoparticles, a dye and/or a surfactant.

14. A process as claimed in claim 2, wherein the viscosity of the liquid reagent is 2-30 cps at room temperature.

15. A process as claimed in claim 2, wherein the diluent is reactive.

16. A process as claimed in claim 1, wherein the thickness of the applied powder layer is in the range of 1.0 to 30 μm.

17. A process for forming a three-dimensional article in sequential cross-sectional layers in accordance with a model of the article, the process comprising the steps of:
   (i) defining a layer of powder material comprising a first reactive component;
   (ii) applying to the layer in a pattern corresponding to a respective cross-sectional layer of the model a liquid reagent comprising a second reactive component and colloidal or nano-particles of ceramics, organic microparticles, metals and alloys wherein the second reactive component includes an oxetane and a photoinitiator;
   (iii) irradiating the layer with electromagnetic radiation to cause the first reactive component to chemically react with itself or with the second reactive component to form a new chemical component and optionally to cause the second reactive component to cure and fill in gaps between the powder; and
   (iv) repeating steps (i) to (iii) to form successive layers; and wherein substantially void-free regions are formed in the article where the liquid reagent has been applied to the powder.

18. A process as claimed in claim 17, wherein the liquid reagent additionally comprises a viscosity lowering diluent.

19. A process as claimed in claim 17, wherein the viscosity of the liquid reagent is 2-20 cps at room temperature.

20. A process as claimed in claim 17, wherein the electromagnetic radiation is selected from the group consisting of TV light, microwave radiation, visible light, and laser beam.

* * * * *